UNITED STATES PATENT OFFICE.

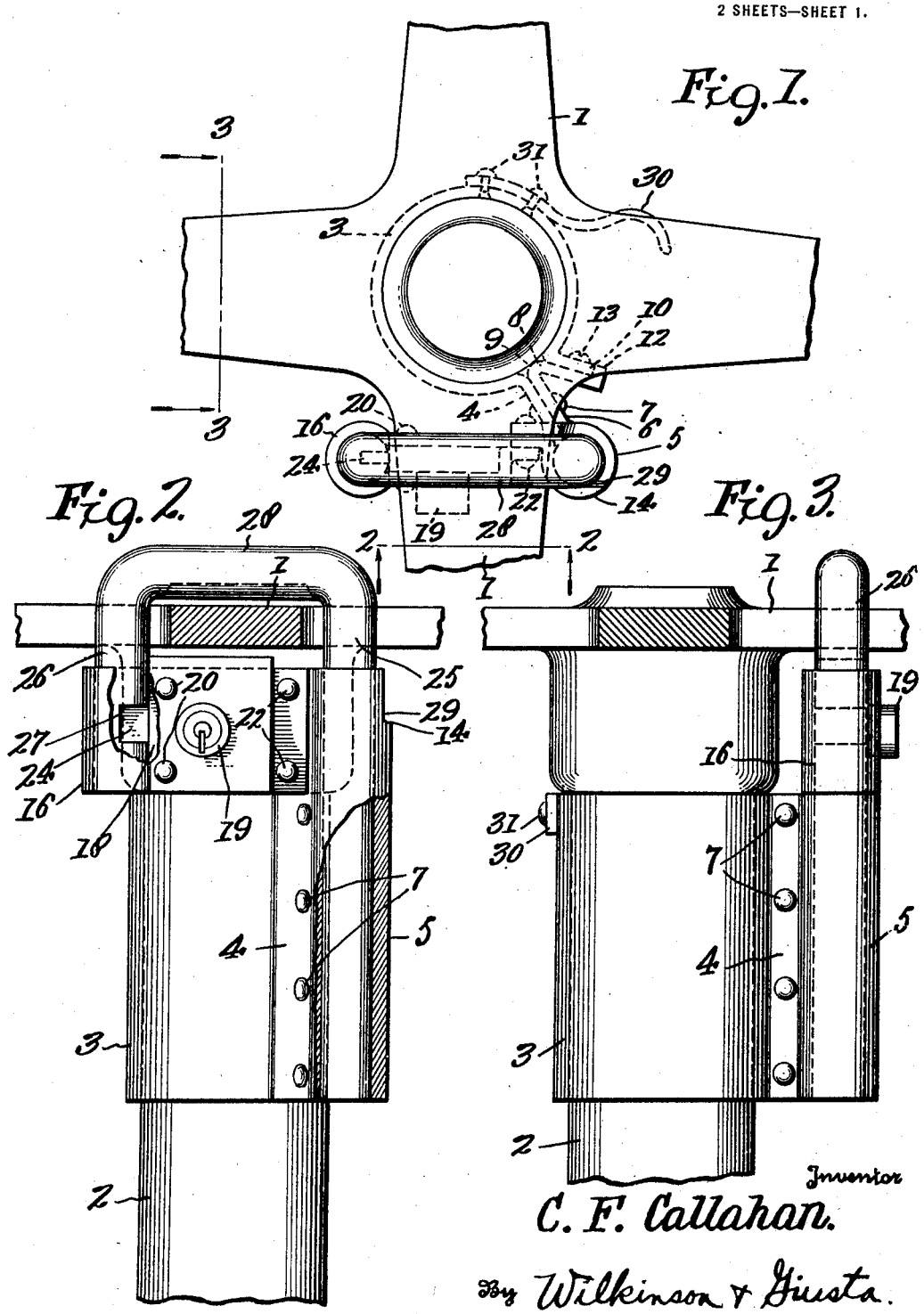

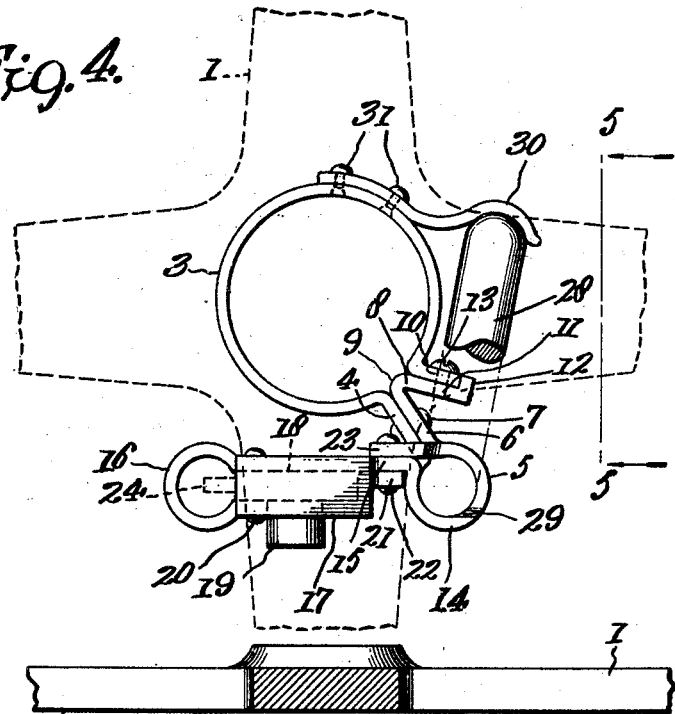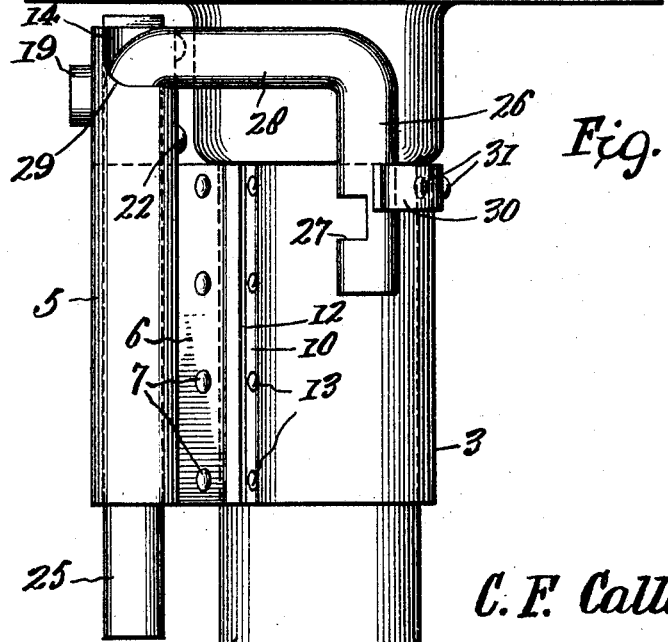

CHARLES FREDRICK CALLAHAN, OF MEMPHIS, TENNESSEE.

AUTOMOBILE-LOCK.

1,400,415. Specification of Letters Patent. Patented Dec. 13, 1921.

Application filed February 9, 1920. Serial No. 357,435.

*To all whom it may concern:*

Be it known that I, CHARLES FREDRICK CALLAHAN, a citizen of the United States, residing at Memphis, in the county of Shelby and State of Tennessee, have invented certain new and useful Improvements in Automobile-Locks; and I do hereby declare the following to be a full, clear, and exact description of the invention, such as will enable others skilled in the art to which it appertains to make and use the same.

The present invention relates to improvements in automobile locks, and more particularly consists in a steering gear lock for preventing the turning of the wheels by unauthorized persons in the absence of the proprietor of the automobile.

It is an object of the present invention to provide a locking device that engages directly with the steering wheel and which serves the double purpose of not only preventing the rotation of such steering wheel, but also avoids the possibility of the steering wheel being removed and replaced by a substitute steering wheel by which thieves are enabled to make off with the vehicles.

Another object of the present invention resides in providing an improved frame for holding the locking device on the steering post, and which is simple in construction and economical of manufacture.

In the accompanying drawings forming a part of this application, and in which similar reference symbols indicate corresponding parts in the several views:

Figure 1 is a fragmentary view of a steering wheel showing the improved locking device engaged therewith.

Fig. 2 is a sectional view taken on the line 2—2 in Fig. 1.

Fig. 3 is a similar view taken on the line 3—3 in Fig. 1.

Fig. 4 is a plan view of the improved locking device shown in unlocked condition and with the steering wheel partially indicated in dotted lines; and Fig. 5 is a sectional view taken on the line 5—5 in Fig. 4.

Referring more particularly to the drawings, 1 designates the arms of the usual steering wheel and 2 the usual fixed steering column.

According to the present invention a frame is mounted on the steering mast 2 and carries a locking device adapted to engage with one of the arms 1 of the steering wheel to effectually secure the wheel against rotation and also removal from the column or mast 2. In the embodiment shown in the drawings, a sheet metal frame is employed consisting of a body portion 3 bent to a cylindrical form as appears in Fig. 4 for the purpose of tightly embracing the steering mast 2. This cylindrical body 3 may be simply clamped tightly about the steering column or mast 2, which will hold it sliding down thereon, or obviously, other means may be employed to positively prevent the accidental creeping of the cylindrical body 3 down on said mast.

The sheet metal frame after passing about the steering post 2 is bent out to provide a radial arm 4, at the outer end of which is formed a cylindrical housing 5. The other end of the housing is directed inwardly to provide an arm 6 radial both with respect to the body 3 and housing 5, and extending in parallelism and contact with the arm 4. Rivets or other suitable fastenings 7 are employed to hold the arms 4 and 6 together. These arms 4 and 6 form supports for carrying the housing 5.

At the end of the arm 6 the sheet metal is bent into substantially V-shape, as indicated at 8, engaging between the spaced apart ends of the body 3 and providing a nose 9 engaging the steering column 2. Arms 10 and 11 are bent from the free end of the body 3 and V-shaped part 8 and lie in contact and parallelism, the outer free end of the arm 11 being overturned, as indicated at 12, against the outer edge of the arm 10. Screws or other fastening means 13 pass through the arms 10 and 11 for securing the same together. The V-shaped portion 8 exerts a spring effect on the arms 4 and 10, tending to draw the same together, thus contracting the body 3 about the steering column 2 and holding the same securely in place thereon.

The housing 5 is continued upwardly above the upper end of the body 3 so as to bring it close beneath the spokes 1 of the steering wheel, as shown in Figs. 2, 3 and 5, and this extension is designated at 14 and is formed out of the same piece of sheet metal, being a continuation of the housing 5.

From the housing extension 14 extends a back plate 15 extending parallel with the axis of the steering column. At the end of the back plate 15 opposite the housing extension 14, the sheet metal is looped as indicated at 16 to provide a striker plate for engaging the locking bolt, as hereinafter more fully described.

After completing the loop 16 the sheet metal is bent back upon itself to provide a front plate 17 extending in parallelism to the back plate 15 and spaced therefrom to receive the locking casing 18 therebetween having a barrel 19 for the insertion of a key. Bolts, rivets, or other fastenings 20 are provided to secure the locking casing 18 to the back plate 15 and front plate 17. The front plate 17 at its free end is bent into substantially Z-shape in order to bring the extremity 21 thereof against the portion of the back plate 15 immediately adjacent the housing extension 14, and bolts, rivets, or other fastenings 22 may be employed to pass through the extremity 21, back plate 15, and the free projecting end 23 of the housing extension 14.

The locking casing 18 is so arranged that the bolt or locking member 24 thereof may project into the striker casing 16, as indicated in Fig. 4.

Rotatably and slidably mounted in the housing 5 and extension 14 is a U-shaped hasp member 25 adapted to straddle an arm 1 of the steering wheel, as shown in Figs. 2 and 3. The shorter free end 26 of the hasp member is adapted to slidably engage in the striker casing 16 and is provided with a notch or recess 27 arranged to be engaged by the bolt 24, whereby the U-shaped hasp member 25 may be held in position, as shown in Figs. 2 and 3, thus preventing the rotation of the steering wheel and also making it impracticable to lift the steering wheel off the column 2.

The horizontal portion 28 of the U-shaped hasp member 25 acts as a handle to lift the hasp member when the locking bolt 24 is withdrawn, whereby the shorter end 26 may be removed from the striker casing 16 and from engagement with the arm 1 of the steering wheel; after which the hasp member 25 may be rotated in the housing 5 and extension 14 until the handle 25 and short arm 26 arrive above the space between adjacent arms of the steering wheel, whereupon the hasp member 25 may be lowered, as shown in Fig. 5, the housing extension 14 being cut away as at 29 to permit such lowering of the hasp member and the subsequent swinging of said member to a position where the short arm 26 may engage with a spring keeper 30 held as by screws or rivets 31 to the body 3. The short arm 26 simply snaps within the keeper 30 and such keeper holds the same against rattling or vibration while the vehicle is in motion.

In use the proprietor of the vehicle will alone be possessed of the key to locking barrel 19, and when leaving the vehicle he will first, in the usual manner, turn the steering wheels toward the curb and thereupon swing the hasp member 25 away from the keeper 30 and lift the same so as to engage over the arm 1 of the steering wheel. The short arm 26 will be made to enter the striker casing 16 and the locking bolt 24 will thereupon be engaged in the recess 27 by the proprietor turning the key in the barrel 19, after which he will withdraw the key and carry it about his person.

In this condition a thief will be prevented from turning the steering wheel so as to direct the wheels away from the gutter, and it will therefore be impracticable to move the vehicle. Moreover, the U-shaped hasp member 25 will prevent the lifting of the steering wheel off the column 2 and the placing thereon of a substitute wheel.

The proprietor has only to insert the key in the locking casing 18 and remove the bolt 24 from the recess 27 in the short arm 26 in order to be able to release the U-shaped hasp member 25 from its engagement with the arm of the steering wheel, and as above described he thereupon moves this arm into engagement with the keeper 30, where it remains until the vehicle is again stopped.

It is obvious that those skilled in the art may vary the details of construction and arrangements of parts without departing from the spirit of my invention, and therefore I do not wish to be limited to such features except as may be required by the claims.

I claim:

1. In combination with a steering column and a steering wheel thereon, of a locking device for the steering wheel including a sheet metal frame having a cylindrical body bent about the steering column, and formed with spaced apart radial arms, a V-shaped part fitting between and secured to said arms and formed with a nose lying against the column, a housing carried by one of said arms, a striker casing also supported by said body, a locking casing having a bolt adapted to project in said striker casing, and a U-shaped shackle member rotatably and slidably mounted in said housing and having an arm engaging about the steering wheel and fitting in said striker casing, said arm having a recess adapted to be engaged by the locking bolt, and a keeper on the body for engaging the short arm of the shackle member, substantially as described.

2. In combination with a steering column and a wheel carried thereby, of a device for locking the wheel including a sheet metal frame bent to form a cylindrical body embracing the steering column beneath the wheel, arms formed from the sheet metal and extending outwardly from the body, a V-shaped part fitting between the arms and having a nose engaging the column, a housing on the outer ends of the arms also bent from the sheet metal, a back and front plate formed from the sheet metal and extending from said housing, a striker casing also formed from said sheet metal, a locking casing secured between said back and front plates and having a locking bolt adapted to enter said striker casing, and a U-shaped shackle member rotatably and slidably fitted in said housing and having an arm adapted to engage in said striker casing and be locked therein by said locking bolt, and a keeper on said body adapted to engage with said arm, substantially as described.

3. In combination with a steering column and a wheel carried thereby, of a device for locking said wheel including a sheet metal frame bent to provide a cylindrical body portion embracing the steering column, radial arms formed in one piece with the body and extending therefrom, the body being split at one side and having its ends spaced apart, a V-shaped part fitted between the split portion of said body and connected to the ends thereof for contracting the body about said post, a housing carried by said arms, a shackle member fitted in said housing and slidable and rotatable therein, a striker casing spaced from said housing and adapted to receive one portion of said shackle member, and locking means for holding the shackle member in the striker casing, substantially as described.

CHARLES FREDRICK CALLAHAN.